(12) United States Patent  (10) Patent No.: US 7,772,791 B2
Lim et al.  (45) Date of Patent: Aug. 10, 2010

(54) METHOD FOR CONTROLLING MOTOR TORQUE IN HYBRID ELECTRIC VEHICLE

(75) Inventors: Seong Yeop Lim, Seoul (KR); Jeong Min Shin, Gyeonggi-do (KR); Young Jun Kim, Busan (KR)

(73) Assignee: Hyundai Motor Company, Seoul (KR)

( * ) Notice: Subject to any disclaimer, the term of this patent is extended or adjusted under 35 U.S.C. 154(b) by 324 days.

(21) Appl. No.: 12/156,229

(22) Filed: May 29, 2008

(65) Prior Publication Data

US 2009/0153087 A1  Jun. 18, 2009

(30) Foreign Application Priority Data

Dec. 13, 2007  (KR) .............. 10-2007-0130042

(51) Int. Cl.
*H02P 6/08* (2006.01)
*G06F 17/00* (2006.01)
(52) U.S. Cl. .............. 318/432; 318/400.15; 318/430; 701/22; 180/65.285
(58) Field of Classification Search .............. 318/430, 318/432, 400.02, 400.15; 701/22; 180/65.285
See application file for complete search history.

(56) References Cited

U.S. PATENT DOCUMENTS

| | | | | |
|---|---|---|---|---|
| 5,743,351 | A * | 4/1998 | McLaughlin | 180/446 |
| 7,525,270 | B2 * | 4/2009 | Washino et al. | 318/432 |
| 2008/0191655 | A1 * | 8/2008 | Ueda et al. | 318/609 |
| 2009/0237014 | A1 * | 9/2009 | Yamada | 318/400.02 |
| 2010/0045217 | A1 * | 2/2010 | Ueda et al. | 318/400.02 |

FOREIGN PATENT DOCUMENTS

| | | |
|---|---|---|
| JP | 2004-080896 | 3/2004 |
| JP | 2006-187155 | 7/2006 |
| JP | 2007-068354 | 3/2007 |
| JP | 2007-135345 | 5/2007 |
| KR | 10-2005-0012778 | 2/2005 |
| KR | 10-2005-0097528 | 10/2005 |

\* cited by examiner

*Primary Examiner*—Paul Ip
(74) *Attorney, Agent, or Firm*—Edwards Angell Palmer & Dodge LLP; Peter F. Corless (57) ABSTRACT

The present invention provides a method for controlling motor torque in a hybrid electric vehicle, which can reduce current control mapping time and simplify control algorithm by providing a torque control compensation logic against a change in temperature of a motor (interior permanent magnet synchronous motor) of the hybrid electric vehicle. The present method includes: forming a single current control map based on an engine room temperature; determining a motor operation range that requires temperature compensation according to motor load conditions such as speed and torque; obtaining an optimization formula for torque command compensation; determining a torque command compensation value using the optimization formula; generating a new torque command with the torque command compensation value and applying the new torque command to the single current control map; and applying to a motor a current for which a torque variation according to a temperature change is compensated.

3 Claims, 7 Drawing Sheets

TORQUE CHANGE ACCORDING TO TEMPERATURE CHANGE

METHOD FOR CONTROLLING MOTOR
TORQUE IN HYBRID ELECTRIC VEHICLE

CROSS-REFERENCE TO RELATED APPLICATION

This application claims under 35 U.S.C. §119(a) the benefit of Korean Patent Application No. 10-2007-0130042 filed Dec. 13, 2007, the entire contents of which are incorporated herein by reference.

BACKGROUND (a) Technical Field

The present invention relates to a method for controlling motor torque in a hybrid electric vehicle, which can reduce mapping time and simplify control algorithm by providing a torque control compensation logic against a change in temperature of a motor (interior permanent magnet synchronous motor) of the hybrid electric vehicle.

(b) Background Art

Characteristics of inductance and permanent magnet magnetic flux of a motor for a hybrid electric vehicle are changed by heat generated by ambient temperature (engine room) and operation conditions.

Such changes affect control characteristics, such as maximum torque per ampere (MTPA) curve and field weakening control and may deteriorate torque control performance. Accordingly, in order to improve power performance and driveability of the hybrid electric vehicle, it is necessary to provide a measure to compensate for the change in torque according to the change in temperature of the motor.

Figure 4:
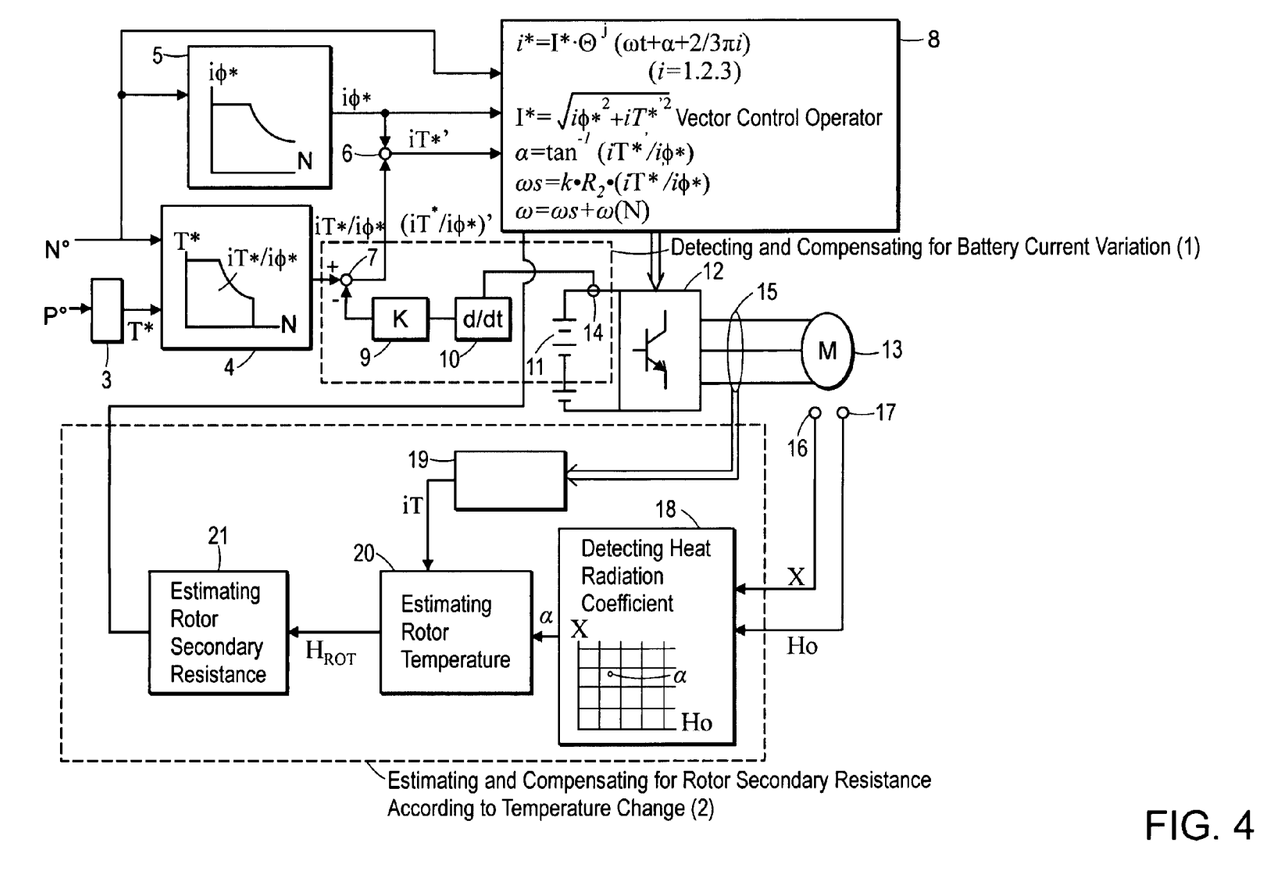
FIGS. 4 and 5 are configuration diagrams illustrating conventional methods of compensating for a change in torque according to a change in motor temperature.

One of the prior art methods of compensating for the torque change is to estimate a rotor secondary resistance with respect to an induction motor and regenerating a current command by a vector control operation, as shown in FIG. 4. For example, Japanese Patent No. 3339208 discloses a method for preventing a torque ripple of a motor generated by a change in battery current and a change in motor temperature. According to the method, during the change in battery current, the variation of battery current is detected to compensate for a current command and the compensated current command is sent to a vector control operator. During the change in motor temperature, a rotor temperature is estimated from an air amount of a motor cooling fan and a temperature of a motor housing to obtain a rotor secondary resistance, and the rotor secondary resistance is sent to the vector control operator to generate a new current command using the same.

The prior art method, however, has drawbacks in that the process of estimating the secondary resistance according to the rotor temperature is required to implement the method and, if an error occurs during the process, its control characteristics become significantly degraded.

Figure 5:
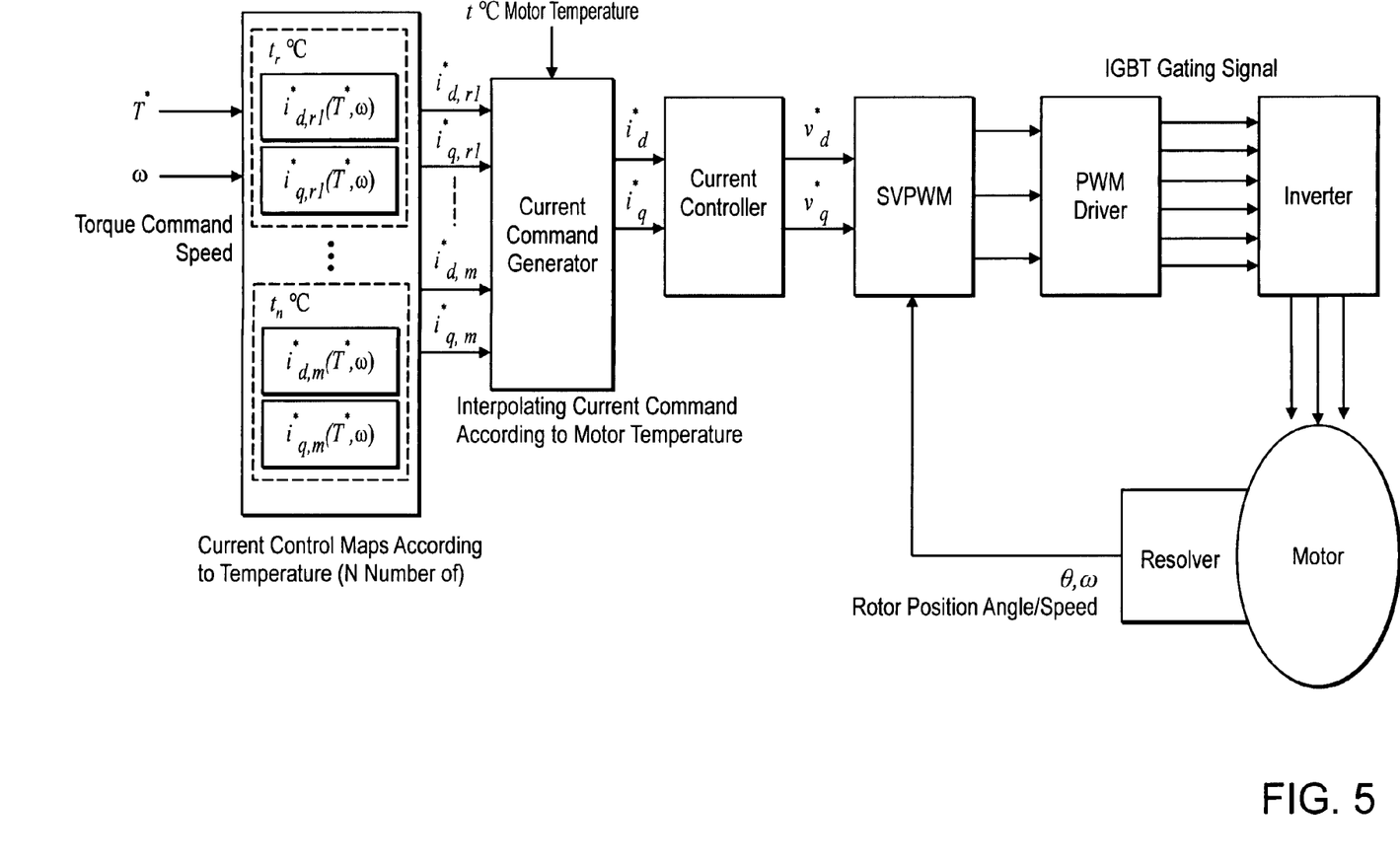

Another prior art method is to form 'n' number of current control maps according to the motor temperature and then interpolate current commands ($i^*_{d,tn-1}$, $i^*_{q,tn-1}$, $i^*_{q,tn}$) at two reference temperatures close to an actual motor temperature when a torque command is applied so that new current commands ($i^*_d$ and $i^*_q$) are generated by a current command generator based on the same, as shown in FIG. 5. According to this method, in which the current commands are interpolated by forming 'n' number of current control maps according to the motor temperature, the process of forming 'n' number of current control maps according to the temperature is required to implement the method. Moreover, in order to form one current control map, it is necessary to apply all of the current commands that a motor control unit (MCU) can combines in all operation ranges to measure an actual torque and then obtain MTPA curve and field weakening control curve. Thus, a great deal of time and effort is required to form n number of current control maps by repeating the above process n times, and the number of the current control maps that can be stored in the MCU is limited by memory capacity.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. One of the objects of the present invention is to provide a method for controlling motor torque in a hybrid electric vehicle, which can compensate for a torque command using an optimization formula by forming a singe current control map based on an engine room temperature and determining a motor operation range that requires temperature compensation.

In one aspect, the present invention provides a method for controlling the torque of a hybrid electric vehicle motor, the method comprising: forming a single current control map based on an engine room temperature; determining a motor operation range that requires temperature compensation according to motor load conditions such as speed and torque; obtaining an optimization formula for torque command compensation; determining a torque command compensation value using the optimization formula; generating a new torque command with the torque command compensation value and applying the same to the single current control map; and applying to the motor a current, for which a torque variation according to a temperature change is compensated.

In a preferred embodiment, the optimized formula for the torque command compensation is obtained by a method including: determining independent variables, such as motor temperature, torque command, and speed, which have an effect on the change in motor torque; eliminating an independent variable having low input characteristics by using Taguchi's orthogonal array; and obtaining a functional relationship between the other independent variables and a dependent variable (torque variation) by using response surface methodology.

In another preferred embodiment, the torque command compensation value is determined by applying a torque command (T*) input from a hybrid control unit and a temperature value (t° C.) input from a motor temperature sensor to the optimization formula.

According to the methods of the present invention, it is possible to significantly reduce the time required to form a current control map, simplify the control algorithm and easily compensate for a change in torque according to a change in temperature, thus improving torque control performance of the motor and reducing manufacturing costs.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

As discussed above, in one aspect, the present invention provides a method for controlling the torque of a hybrid electric vehicle motor, the method comprising: forming a single current control map; determining a motor operation range that requires temperature compensation; obtaining an optimization formula for torque command compensation; determining a torque command compensation value; generating a new torque command with the torque command compensation value; and applying a compensated current to the motor.

More particularly, first, a single current control map is formed based on an engine room temperature, which is, but not limited to, about 100° C. Since the position where a hybrid motor is provided is the engine room, the temperature around the motor during vehicle operation is directed to the engine room temperature, and accordingly a single current control map is formed based on the engine room temperature.

Figure 1:
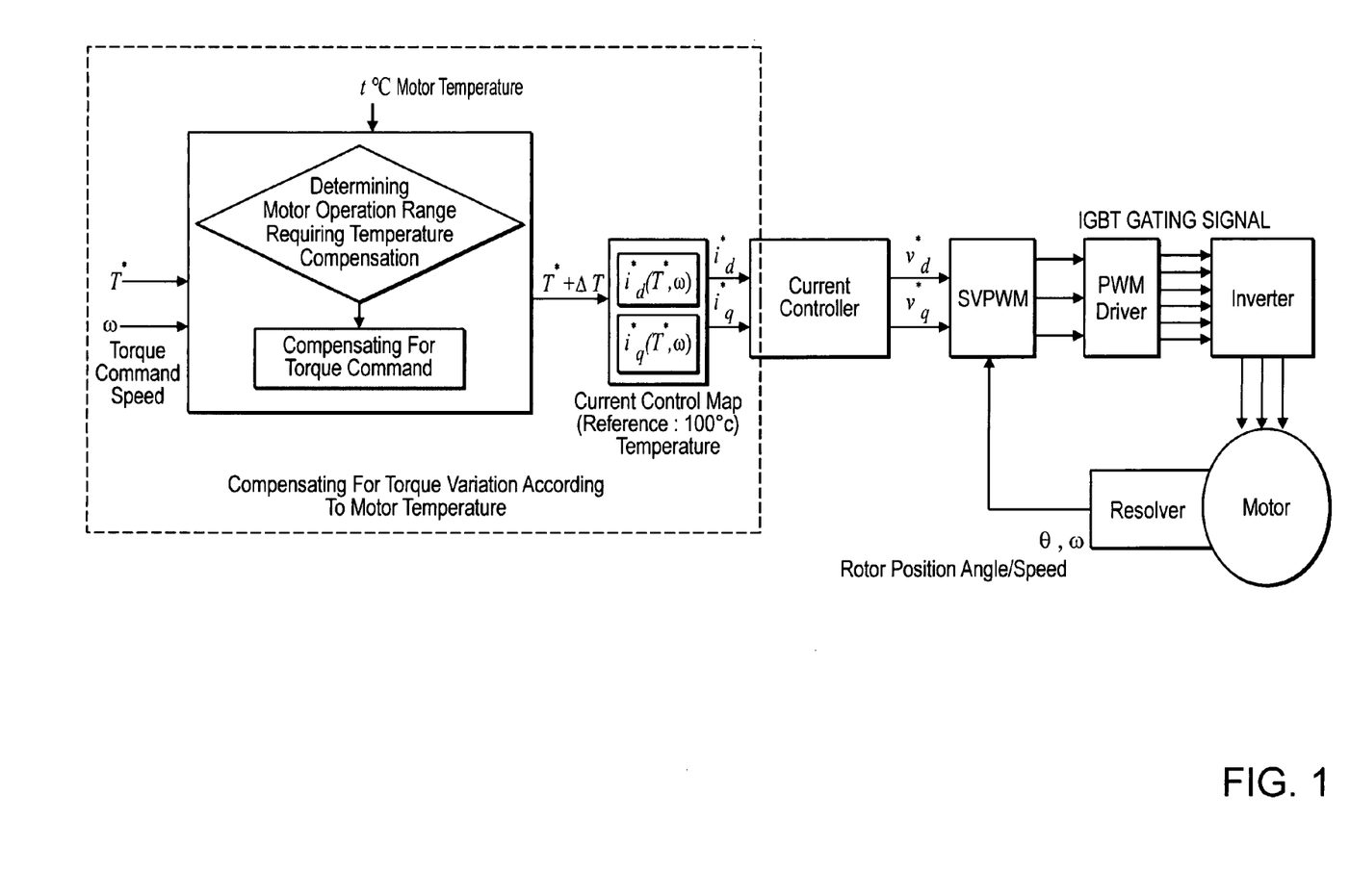
FIG. 1 is a configuration diagram illustrating a method for controlling motor torque in a hybrid electric vehicle in accordance with a preferred embodiment of the present invention.
Figure 2:
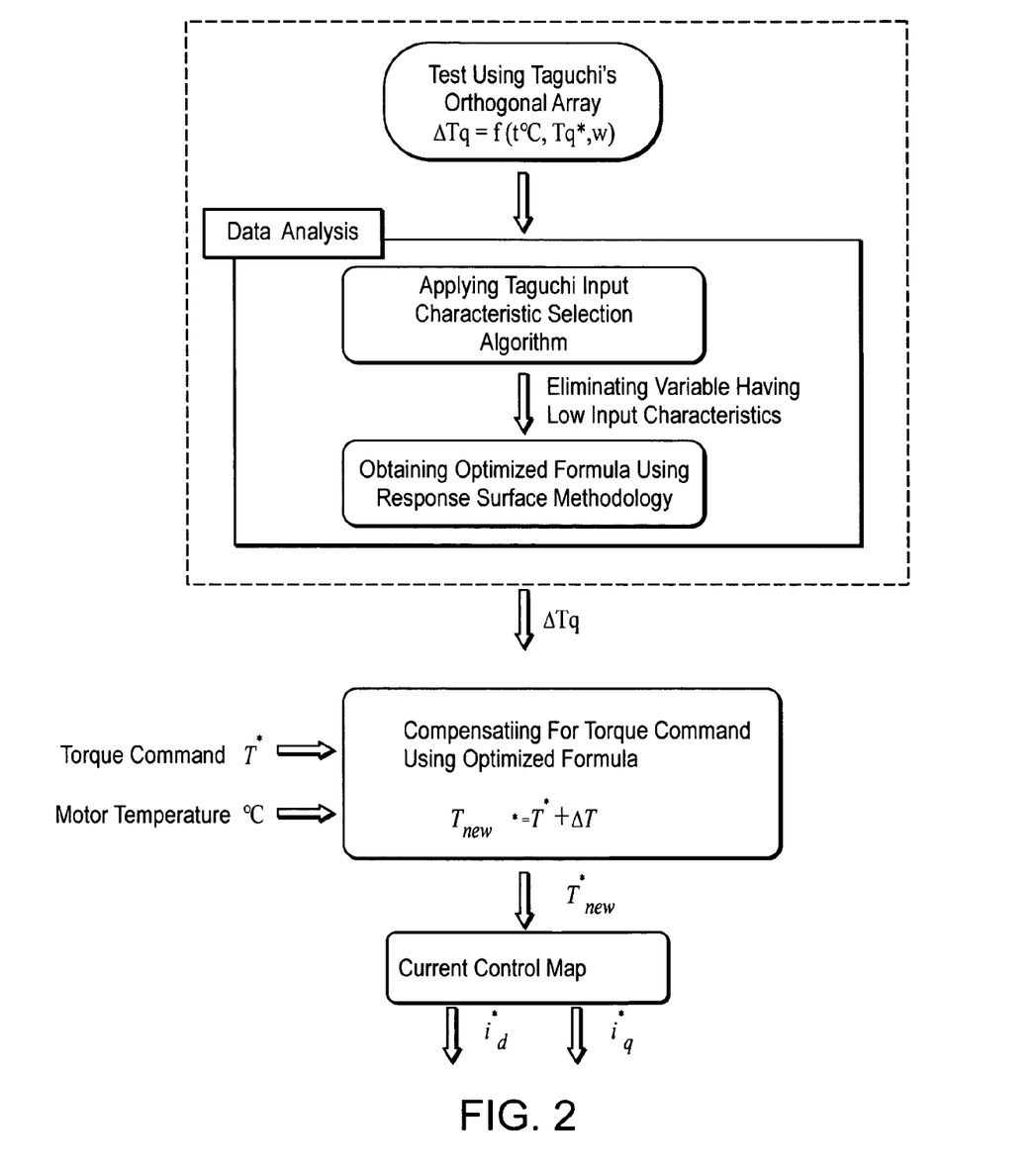
FIG. 2 is a flowchart illustrating a process of obtaining an optimized formula and compensating for a torque command in the method for controlling motor torque in the hybrid electric vehicle in accordance with a preferred embodiment of the present invention.
Figure 3:
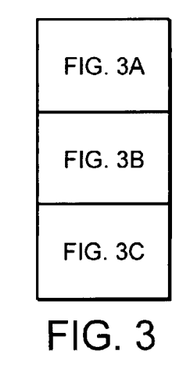
FIG. 3 is a diagram showing a change in torque according to a change in temperature and applied to determine a temperature compensation range in the method for controlling motor torque in the hybrid electric vehicle in accordance with a preferred embodiment of the present invention.
Figure 3A:
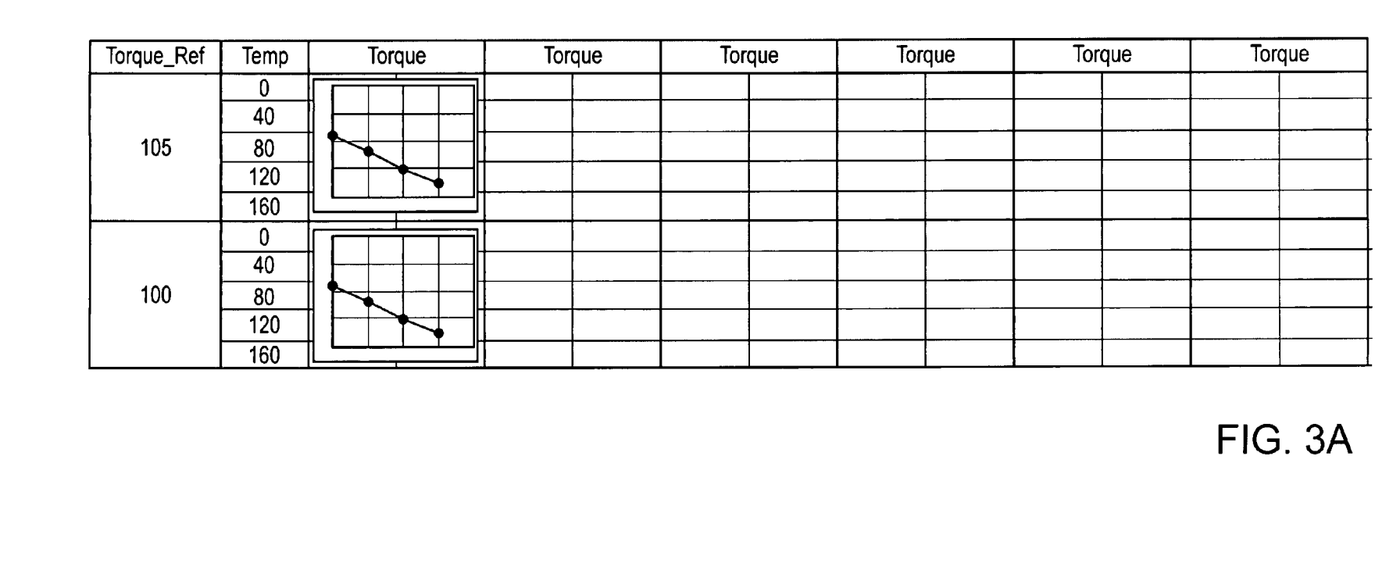
Figure 3B:
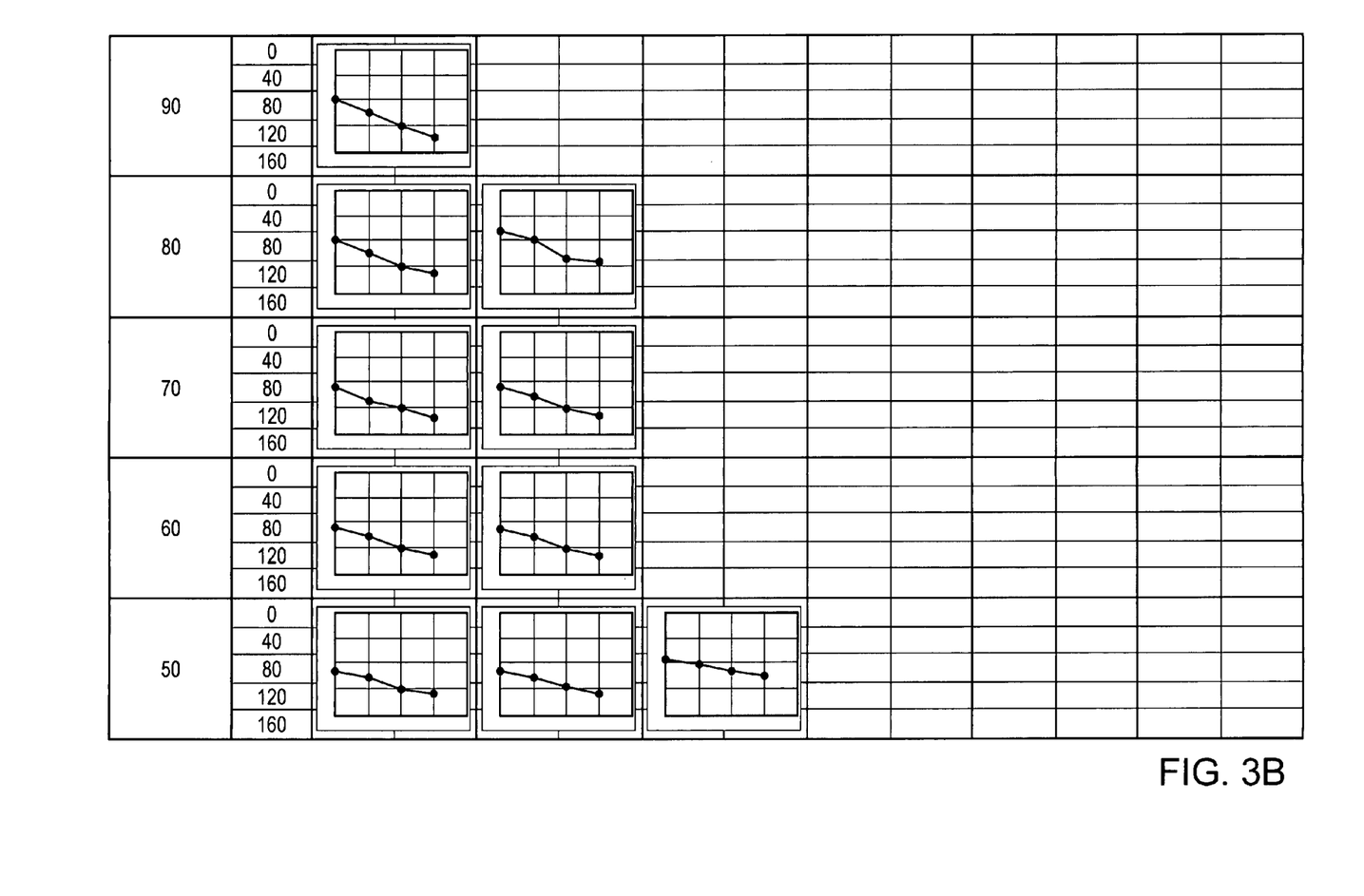
Figure 3C:
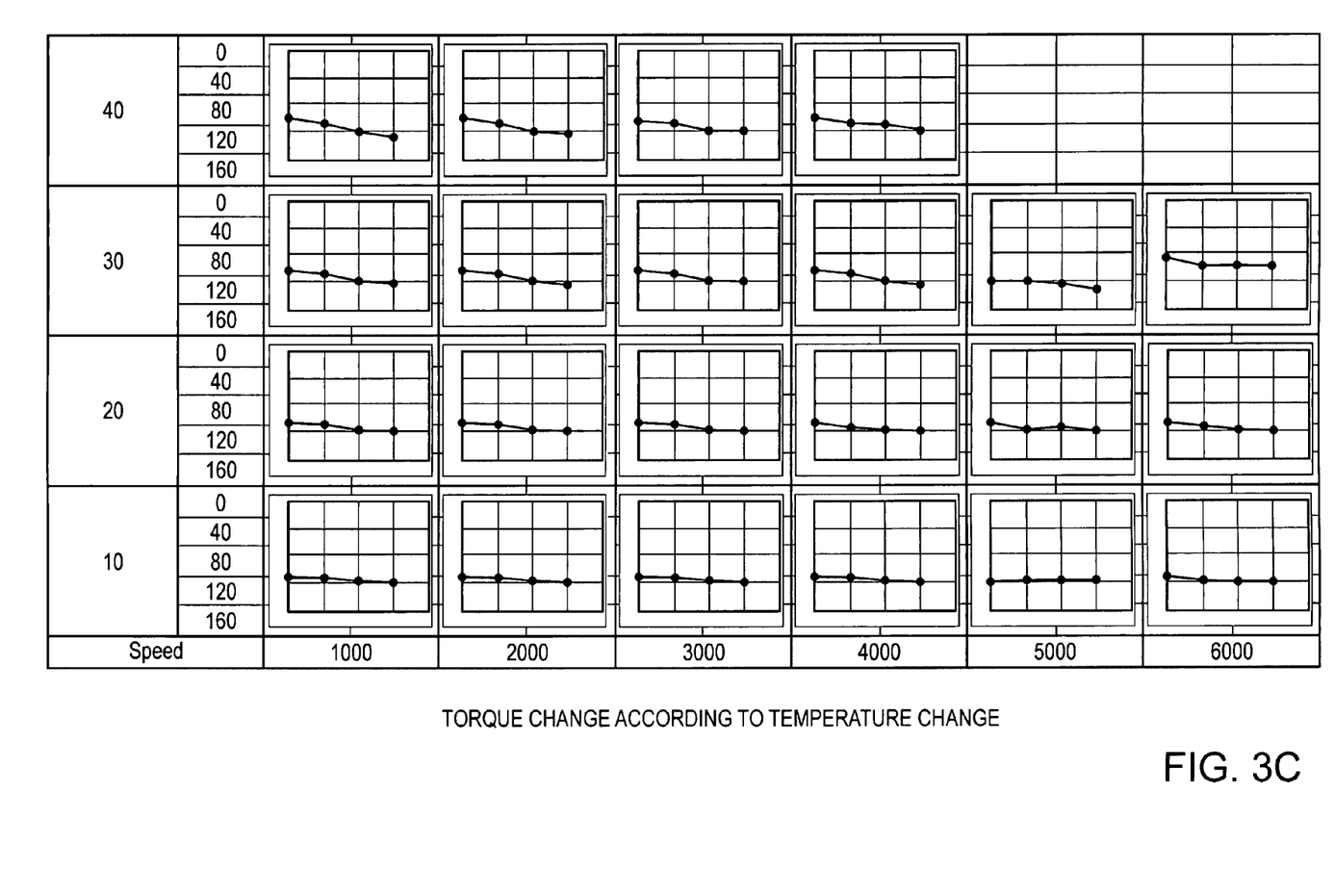

Next, a motor operation range that requires temperature compensation is determined according to motor load conditions such as speed and torque. As shown in FIG. 3, in which the change in torque according to the change in temperature is shown with respect to the operation ranges, the change in motor torque has a linearity and the variation differs according to the operation conditions, which means that it is possible to determine a temperature compensation range according to the motor torque control performance. In this case, as criteria for the determination of the motor operation range that requires temperature compensation, a motor torque control degree (error) of the MCU with respect to a torque command value of a hybrid control unit (HCU) is applied.

Subsequently, an optimization formula for the motor torque command compensation is derived. The process of obtaining the optimization formula for the motor torque command compensation is as follows. Independent variables, such as motor temperature, torque command, and speed, which have an effect on the change in motor torque, are determined. An independent variable or independent variables having low input characteristics is eliminated using Taguchi's orthogonal array. The optimized formula is derived from a functional relationship between the remaining independent variable or variables and a dependent variable (i.e. torque variation) using response surface methodology.

Thereafter, a torque command compensation value is determined using the optimized formula. In particular, the torque command compensation value is determined by applying a torque command (T*) input from the HCU and a temperature value (t° C.) input from a motor temperature sensor to the optimization formula. In more detail, since the variation in motor torque is affected by motor temperature (X1), torque command (X2), and speed (X3), it can be represented by Y=aX1+bX2+cX3. After eliminating one independent variable that has less effect on the torque variation using Taguchi's orthogonal array, the torque variation according to the remaining two independent variables is derived as a function (optimization formula) using response surface methodology, which can be represented by Y=aX1+bX2. The above process of deriving the optimized formula can be performed by, e.g., data analysis using a Minitab tool.

Accordingly, if a new torque command is generated with the torque command compensation value and applied to the single current control map, a current for which the torque variation is compensated accordance to the change in temperature is applied to the motor.

As described above, the present invention provides advantages including the following: it is possible to significantly reduce a current control mapping time and simplify a control algorithm; it is possible to significantly improve motor torque control performance; since only one current control map is stored in the MCU, it is possible to reduce memory capacity of MCU; and it is possible to reduce manufacturing costs.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling the torque of a motor in a hybrid electric vehicle, the method comprising:

forming a single current control map based on an engine room temperature;

determining a motor operation range that requires temperature compensation according to motor load conditions such as speed and torque;

obtaining an optimization formula for torque command compensation;

determining a torque command compensation value using the optimization formula;

generating a new torque command with the torque command compensation value and applying the same to the single current control map to create a current for which a torque variation according to a temperature change is compensated; and applying the compensated current to the motor.

2. The method of claim 1, wherein the optimization formula for the torque command compensation is obtained by a method in which independent variables, such as motor temperature, torque command, and speed, which have an effect on the change in motor torque, are determined, at least one independent variable having low input characteristics is eliminated using Taguchi's orthogonal array, and a functional relationship between the remaining independent variable or variables and a dependent variable is obtained using response surface methodology.

3. The method of claim 1, wherein the torque command compensation value is determined by applying a torque command (T*) input from a hybrid control unit and a temperature value (t° C.) input from a motor temperature sensor to the optimization formula.

* * * * *